United States Patent [19]
Gilbert et al.

[11] 4,182,364
[45] Jan. 8, 1980

[54] ADJUSTABLE BALL COCK RISER

[75] Inventors: Russell T. Gilbert, Newport Beach; Armand E. Antunez, Jr., Glendora, both of Calif.

[73] Assignee: Coast Foundry & Mfg. Co., Pomona, Calif.

[21] Appl. No.: 811,609

[22] Filed: Jun. 30, 1977

[51] Int. Cl.² ............................................. F16K 31/24
[52] U.S. Cl. .................................... 137/426; 137/437; 138/121; 138/173; 285/303; 285/322
[58] Field of Search ............... 137/414, 426, 434, 436, 137/437, 441, 442, 451; 251/45; 285/303, 322; 138/121, 173

[56] References Cited
U.S. PATENT DOCUMENTS

| | | | |
|---|---|---|---|
| 1,542,553 | 6/1925 | Hornbeck | 285/303 |
| 2,329,337 | 9/1943 | Criss et al. | 137/436 |
| 2,827,073 | 3/1958 | Owens | 137/437 |
| 3,120,857 | 2/1964 | Fischer et al. | 137/436 |
| 3,754,781 | 8/1973 | Conroy | 285/322 |
| 3,785,290 | 1/1974 | Castor et al. | 138/121 |
| 3,797,518 | 3/1974 | Holm et al. | 137/442 |
| 3,798,586 | 3/1974 | Huska | 285/322 |

*Primary Examiner*—Martin P. Schwadron
*Assistant Examiner*—G. L. Walton
*Attorney, Agent, or Firm*—Gausewitz, Carr & Rothenberg

[57] ABSTRACT

An adjustable riser for a toilet tank is formed of a pair of mutually telescoped members slidably sealed to each other and readily locked in any one of a selected number of longitudinally adjusted positions by means of a number of tapered fingers having projections that are pressed into one of a series of grooves in the inner member by a threaded lock nut.

14 Claims, 6 Drawing Figures

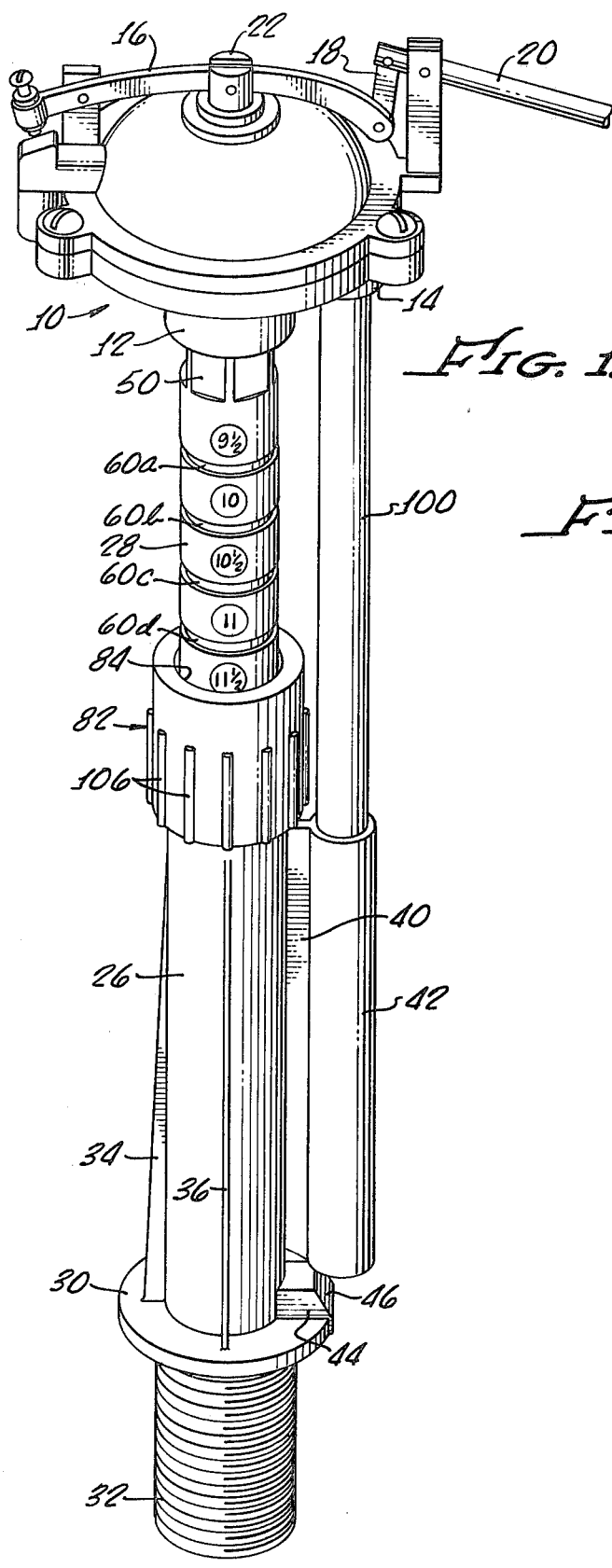
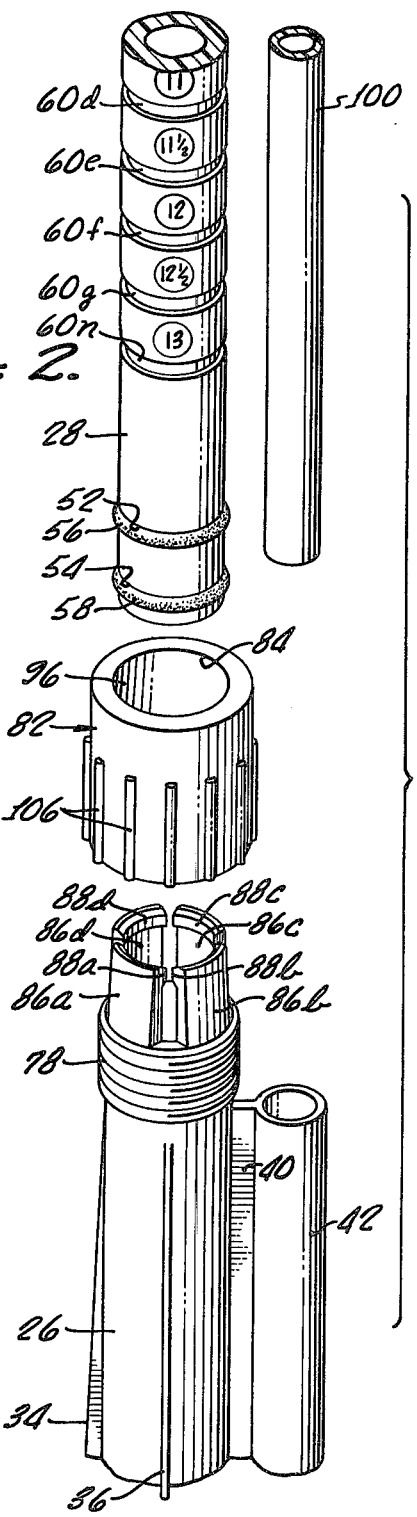
FIG. 1.
FIG. 2.

ADJUSTABLE BALL COCK RISER

BACKGROUND OF THE INVENTION

The present invention relates to ball cock assemblies, and more particularly concerns a toilet tank ball cock assembly having an adjustable riser. The conventional ball cock assembly for a toilet tank includes an input conduit that flows water from a fitting or supply pipe at the bottom of the tank to a float operated valve mounted atop the conduit above the normal water level. A fill tube extends downwardly toward the bottom of the tank from the valve so that when the valve is open water will flow through the input conduit, through the valve, and thence through the fill tube into the tank. Toilet tanks are manufactured in many different sizes and shapes and in many different heights. The ball cock assembly must have a height commensurate with the height of the tank and therefore replacement ball cock assemblies or replacement risers therefor must either be manufactured in many different lengths to fit many different tanks, or the assembly must be made longitudinally adjustable for use in any one of a number of different tanks. Further, for the manufacture of tanks of a number of different sizes, it is more convenient and economical to have on hand a quantity of identical riser assemblies than to store a number of different riser assemblies, each fitting only one type of tank.

Longitudinally adjustable toilet tank risers, such as that shown in the patent to Holm, et al. U.S. Pat. No. 3,797,518 have been used but exhibit a number of disadvantages. In particular the prior art adjustable risers are more costly and more difficult to adjust. For example, the riser of U.S. Pat. No. 3,797,518 employs a movable O-ring selectively positioned in any one of a number of grooves so as to form a stop for the lower element of the adjustable riser. A threaded nut forces the lower element against the O-ring after the latter has been placed in the selected groove. The device of this patent employs an identical type of adjustment for the adjustable length fill pipe. Thus, in order to adjust the length of this assembly, the tight fitting O-rings must be pried out of one groove and moved to another groove. Not only is it difficult to achieve such an adjustment, but if the O-ring is not properly seated in the groove or is twisted or otherwise distorted, it may function improperly. Further, the O-rings may be lost or misplaced and proper adjustment cannot be achieved without the O-ring in such an arrangement.

Accordingly, it is an object of the present invention to provide an adjustable ball cock riser that avoids or eliminates above-mentioned problems.

SUMMARY OF THE INVENTION

In carrying out principles of the present invention in accordance with a preferred embodiment thereof, an adjustable length water supply riser comprises mutually telescoped members that are slidably sealed to each other, the first member having a plurality of axially spaced circumferential grooves and the second member having a plurality of axially extending resilient fingers at least some of which have inwardly directed projections which can be locked in a selected one of the grooves. According to a feature of the invention, the fingers collectively form a frusto-conical locking surface for cooperation with a mating frusto-conical surface of a locking nut threaded on the second member to press and lock the fingers and their projections in the groove.

According to another feature of the invention relative twisting of the telescoping members is further restrained by an unique configuration and cooperation between finger projections and grooves.

BRIEF DESCRIPTION OF THE DRAWINGS

FIG. 1 is a perspective view, of an adjustable ball cock assembly embodying principles of the present invention;

FIG. 2 is an exploded view, showing certain components of the adjustable riser of FIG. 1;

DETAILED DESCRIPTION

Figure 3:
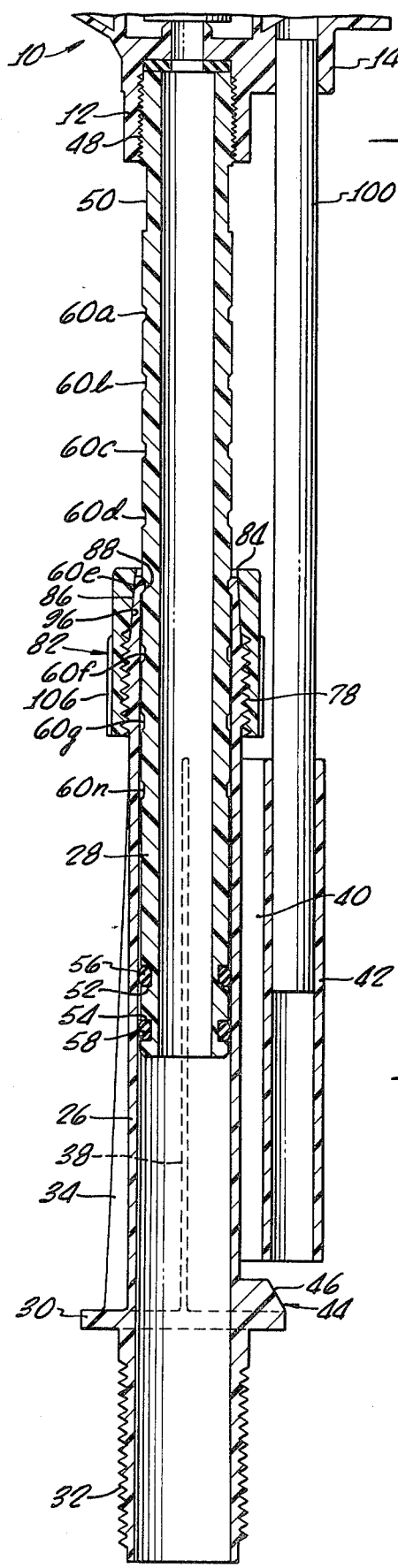
FIG. 3 is a longitudinal sectional view through part of the riser of FIG. 1.

As shown in FIG. 1, an adjustable ball cock riser includes a float actuated or "ball cock" valve 10, which may be of the type shown in U.S. Pat. No. 2,635,622 to Owens. The valve has an input fitting 12 through which water is supplied to the valve and an output fitting 14 from which water is provided by the valve. A set of levers 16, 18, 20 are pivoted to the valve body and to a valve stem extension 22 so that a float (not shown), connected to lever 20, may operate to close the valve when the water in the tank reaches a selected fill level and open the valve when the water is below such level.

An adjustable length water supply riser includes an outer pipe 26 and an inner pipe 28 which is slidably telescoped within the outer pipe. The latter is formed with a fixed flange 30 adjacent a lower threaded end 32. The flange is adapted to bear upon a conventional conical shaped annular gasket (not shown) which, in turn, bears upon the bottom of the inner surface of a tank. Suitable threaded locking nuts (not shown) on the threaded end 32, outside of the tank, firmly secure the pipe 26 to the tank bottom.

Pipe 26 is of a right circular cylindrical configuration, having smooth inner and outer walls and is formed with three reinforcing ribs 34, 36, 38 extending from the flange 30 upwardly along the length of the pipe 26 and tapering from a maximum radial extent adjacent flange 30 to merge with the surface of pipe 26. The ribs are spaced by 90° from each other and a fourth reinforcement, diametrically opposed to the rib 34, is provided by a longitudinally extending bar 40 affixed to the pipe and fixedly carrying at its outer end a fill tube sleeve 42 that is open at both ends. A water deflector 44 is affixed adjacent the lower end of pipe 26 upon the flange 30 and has an inclined end 46 for deflecting fill water flowing downwardly from the bottom of fill sleeve 42.

Inner pipe 28 has an upper end threaded, as at 48, for securement to the internally threaded input fitting 12 of the valve. Just below the threaded end 48, pipe 28 is formed with an hexagonal outer surface having a number of flats 50 for reception of a wrench or other tool to assist in threading the pipe into the valve fitting. The lower end of inner pipe 28 is formed with a pair of axially spaced and relatively deep grooves 52, 54 which receive and seat sealing O-rings 56, 58. This end of the pipe 28 is retained within the outer pipe 26 during all positions of adjustment. Thus the sealing relation of the two O-rings and the inner surface of the outer pipe 26 is not disturbed during adjustment.

Between the O-rings at its lower end and the threaded and tool receiving portion at its upper end, inner pipe 28 is formed with a plurality of circumferentially extending longitudinally spaced shallow grooves 60a, 60b, 60c, etc. Preferably these grooves are spaced by predetermined distances such as, for example, precisely one-half inch to center spacing between each. Appropriate indicia, such as numbers 9½, 10, 10½, 11, etc. are imprinted upon the outer surface of the inner pipe 28 and between the grooves so as to indicate the riser length (in inches) when a particular adjustment is made.

Figure 4:
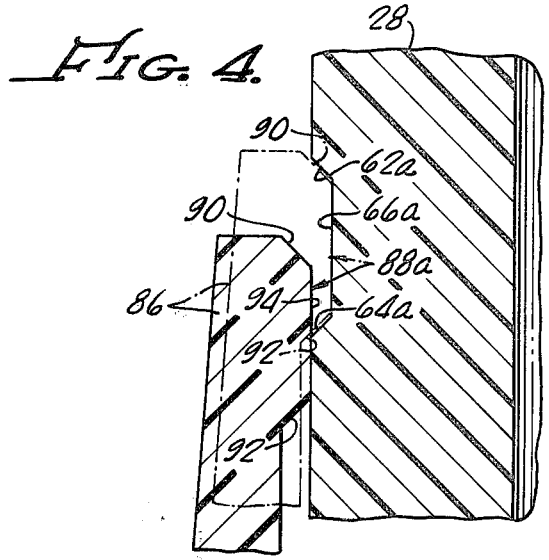
FIG. 4 is an enlarged section showing a typical spring finger projection and groove.

The size and shape of grooves 10a, 10b, etc. (relative to locking fingers to be described below) are important factors in assuring both a firm locking of the telescoping members against both relative rotational and longitudinal motion, and also an easy longitudinal adjustment in unlocked condition. Each of the grooves 60a, 60b, etc. has a longitudinal extent greater than its depth. For example, each groove may be approximately 0.120 inches long and have a depth of about 0.013 to 0.015 inches. The grooves are preferably formed with upper and lower mutually opposed flat beveled sides 62a, 64a, 62b, 64b, etc. defining for each groove a pair of frusto-conical faces that flank the annular groove bottoms 66a, 66b, etc. (FIG. 4).

Figure 5:
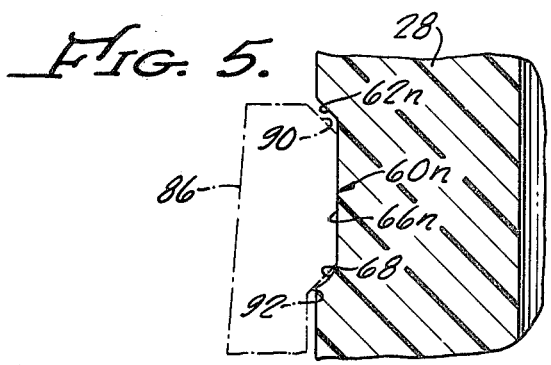
FIG. 5 shows details of a lowermost groove.

The lowermost groove 60n has the same dimensions as the other grooves, and has a flat annular bottom 66n and an upper frusto-conical face 62n, just like all of the other grooves. However, the lower side of this groove is a curved face, formed on a radius of 0.020 inches, for reasons to be described below (FIG. 5).

Adjacent to, but spaced from, the upper end of the outer pipe 26, a number of conventional exterior threads 78 are formed for cooperation with internal mating threads on a locking nut 82 having a through aperture 84 that allows the nut to freely slide along the inner pipe 28.

At the upper end of outer pipe 26, between the end of the pipe and threads 78, are formed a plurality of axially extending mutually circumferentially spaced resilient fingers 86a, 86b, 86c and 86d. The fingers are fixed only at their lower ends and thus are cantilevered from the end of the pipe. At the outer, free end of each finger is formed a radially inwardly extending projection, such as projections 88a, 88b, 88c and 88d, a typical one of which is more clearly shown in the enlarged illustration of FIG. 4. As can be seen in FIG. 4, each projection has an upper and lower inclined frusto-conical face 90, 92, each substantially parallel to and co-acting with a corresponding one of the frusto-conical inclined faces 62, 64 of a selected groove in the inner pipe 28. In a preferred embodiment, the finger projections, such as projection 88a, extend radially of the finger by a distance greater than the depth of the groove. Further, the longitudinal extent of the end 94 of the projection is slightly less than the longitudinal extent of the bottom 66 of the groove. Thus if the finger and its projection is urged radially inwardly toward the groove, the end 94 of the projection will contact the bottom 66 of the groove. However, the difference in dimensions (0.085 inches for end 94 and 0.090 inches for bottom 66) is so small and the projection sufficiently resilient that the projection may be sufficiently compressed to ensure that the frusto-conical faces of the projection, faces 90 and 92, will engage the mating faces 62, 64 of the groove. Thus there is provided a firm surface contact of maximized area. If the corners of the grooves, or the corners of the projection are rounded rather than beveled or inclined as shown, the projections, when urged toward the groove, would contact the latter over considerably smaller areas of their adjoining surfaces. The described arrangement greatly increases the contacting area of the mating surfaces of projections and groove and thus can provide a greater resistance to relative rotation of the inner and outer pipes about the pipe axis. With the groove shallower than the depth of the projection, bottoming of the projection end 94 upon groove bottom 66 is ensured.

The described arrangement ensures a greater area of contact over the mating frusto-conical and end faces and this provides increased resistance both to relative rotation and relative longitudinal motion of the inner and outer pipes.

The axial extent of the projection is sufficient to ensure adequate shear strength and, in the illustrated embodiment, it is considerably greater than the radial extent thereof. This is particularly so because the radial extent of the projection is made small to minimize force required to effect the longitudinal adjustment.

The radial extent of each projection and the depth of each groove are both made relatively small and considerably less than the thickness of the resilient fingers 88a, b, c, and d. Thus, only a relatively small radial deflection of the finger end is necessary to move the projection from the position (shown in solid lines in FIG. 4), wherein the two telescoping pipes are free to slide relative to one another, and a locking position (shown in dotted lines) wherein the projection penetrates the groove and the mating faces are in contact. In the normal, unstressed position of the fingers the diameters of corresponding portions of inclined faces 90, 92 and projection end 94 are slightly less than diameters of corresponding points on inclined faces 62, 64 and groove bottom 66 so that the projections may be lightly maintained in a position of penetration within the grooves by their own resilience and are slightly bent outwardly from a normal unstressed position thereof. However, the length of the spring fingers, the resilience of the finger material and the described configuration are such that only a relatively slight axial force is necessary to shift the telescoping pipes 26 and 28 relative to one another during the course of such shifting (assuming that there is no radial locking force exerted upon the fingers). The inclined faces 90 and 62 and the inclined faces 92 and 64 act as cams to force the projections outwardly of the grooves against the resilience of the cantilevered fingers by a distance sufficient to allow the relative axial sliding motion of the two pipes. The projections noticeably and audibly click into the several grooves during adjustment to facilitate rapid positioning. As previously mentioned, because of the relatively small radial extent of the projection and the relatively shallow depth of the groove, only a small radially outward deflection of the fingers is necessary to allow such sliding motion and thus only a small axial force is required to effect adjustment of the two pipes relative to one another.

It may be noted that the described frusto-conical faces more readily permit relative sliding (in unlocked condition) than do similar curved faces formed on a radius. If the projections and groove surfaces are curved rather than straight (as viewed in the plane of FIG. 4, for example), it is more difficult to cam the projection out of the groove in response to forces directly axially of the telescoping members. However, it is not desirable, when extending the length of the telescoping members, to cam the finger projections out of (beyond) the lowermost groove 60n since the two pipes may be thus completely separated inadvertently. For this reason, the lower side of the end groove 60n is curved as at 68 (FIG. 5). Thus the outer pipe can be moved axially of the inner pipe with relatively little force, but a greater force is required to extend the two beyond the maximum length adjustment wherein the finger projections are received in the groove 60n.

Thus it will be seen that the two pipes 26 and 28 may be relatively adjusted to adjust the total length of the riser. This adjustment is readily and precisely accomplished in predetermined increments because of the predetermined spacing of the grooves and pipe 28 and the audible and tactile manifestation of adjustment positions.

Figure 6:
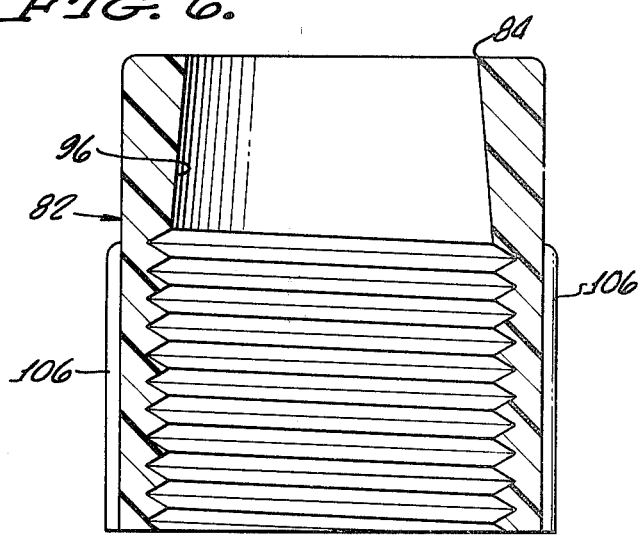
FIG. 6 illustrates details of the internally tapered locking nut.

To lock the two pipes in adjusted position, it is merely necessary to hold the fingers in their inwardly urged position, each penetrating a portion of a corresponding groove. This inward holding of the fingers is accomplished by the lock nut 82 which is formed with an internal frusto-conical or tapered face 96 (FIG. 6). The outer surface of each of the fingers 86a, b, c and d is also longitudinally tapered so that such outer surfaces collectively form a discontinous tapered or frusto-conical surface that mates with the internal frusto-conical surface 96 or lock nut 82. The amount of this taper may vary widely as long as it is substantially the same for the tapered outer surface of the fingers and the tapered inner surface of the lock nut. In a preferred embodiment, the taper is 5°.

The use of the mating inclined faces of the projection and groove allows locking with a small deflection and at the same time avoids the need to use much spring tension of the cantilevered fingers for holding the projections in the grooves.

A fill pipe 100 has its upper end snugly received in output fitting 14 of the valve 10 and its lower end relatively loosely and slidingly received in sleeve 42. If deemed necessary or desirable, the fill pipe 100 may be threaded into or otherwise secured in the fitting 14 and suitable sealing, such as O-rings, may be provided between the pipe 100 and the fill pipe sleeve 42. However, it is found that a snug fit of the fill pipe 100 in the fitting 14 is all that is necessary to hold it in place. Further, no liquid seal is necessary between the fill pipe and its sleeve since leakage at this point is of no significance. The purpose of the fill pipe is to direct water from the valve into the tank and if leakage should occur between the fill pipe and its sleeve, such leakage would only find its way into the interior of the tank.

The fill pipe, having no sealing with the sleeve 42, being only a snug friction fit and not otherwise fixed to the valve, provides relatively little restraint against torsional forces that may be exerted upon the riser. Such torsional forces (as may be exerted by the long arm of the float, for example) tend to pivot pipe 28 about its axis relative to pipe 26. Such pivoting will laterally displace the float and may cause it to bend. It is partly for this reason that the above-described enhanced friction of the frusto-conical mating faces of the finger projections and the corresponding grooves are provided. As the lock nut 82 is threaded down upon threads 78 of pipe 26, its tapered bore 96 engages the tapered conical surface formed on the outer sides of the fingers and moves these radially inwardly with great force. The nut is threaded down upon the threads 78 until the faces 90 and 92 of the several finger projections contact the faces 62 and 64 of the selected groove. The projections are jammed tightly against the groove faces and bottoms to effectively restrain both relative rotation in response to applied torsional forces and relative longitudinal shifting.

Lock nut 82 may be formed with a configuration suitable for use with any convenient tool or, as shown in the illustrated embodiment, may be provided with a number of circumferentially spaced longitudinally extending ribs or serrations 106 to facilitate manual turning.

The illustrated riser assembly may be made of many different materials and in one or more pieces suitably secured together as may be deemed necessary or desirable.

However, in the preferred embodiment, all parts are injection molded of a suitable high strength and resilient plastic. A material such as Delrin may be advantageously used. Preferably, outer pipe 26 is molded as an integral unit, including its flange 30, reinforcing ribs 34, 36, 38, bar 40, sleeve 42, and all of the fingers. Each of the other parts (other than the valve and sealing O-rings 52 and 54) is an integral injection molded piece in the preferred embodiment.

The foregoing detailed description is to be clearly understood as given by way of illustration and example only, the spirit and scope of this invention being limited solely by the appended claims.

What is claimed is:

1. An adjustable ball cock assembly for a toilet tank comprising,
    a valve,
    a fill pipe connected to said valve, and
    an adjustable length water supply riser connected to said valve, said riser comprising
        inner and outer mutually telescoped members slidably sealed to each other, one of said members being connected to said valve, and the other to said members being adapted to be connected to a tank, said inner member having a plurality of axially spaced circumferential grooves, said outer member having a plurality of axially extending resilient fingers, at least some of said fingers having inwardly directed projections, and
        means for locking said projections in a selected one of said grooves, at least one of said projections extending radially of its finger by a distance greater than the depth of at least one of said grooves to insure contact of the end of the projection with the bottom of the associated groove, said one projection being adapted to be pressed into said one groove to provide increased area of interengagement and increased resistance to relative rotation with said riser members.

2. The assembly of claim 1 wherein at least one of said grooves has a frusto-conical face, wherein at least one of said projections has a circumferentially extending inclined face that mates with said frusto-conical face, and wherein said means for locking comprises means for urging said cooperating faces toward each other, said one projection being sufficiently resilient and said distance being sufficiently small that the projection may be compressed to insure contact of the inclined projection face with a frusto-conical groove face.

3. The assembly of claim 1 wherein said projections and grooves are formed with mutually cooperating tapered faces, and wherein said means for locking comprises means for urging said cooperating tapered faces against each other.

4. The assembly of claim 1 wherein said grooves each has a groove bottom and a pair of opposed frusto-conical faces flanking said groove bottom, wherein said projections each has an end and all collectively form a pair of opposed frusto-conical faces mating with said groove faces and flanking said projection ends, said faces, groove bottom, and projection ends all being adapted to be pressed into contact to provide increased area of interengagement and increased resistance to relative rotation of said riser members.

5. The assembly of claim 4 wherein said projection end has a length slightly less than the length of said groove bottom and wherein each said projection extends radially of its finger by a distance greater than the depth of at least one of said grooves.

6. The assembly of claim 1 wherein each said projection has a longitudinal extent greater than its radial extent.

7. The assembly of claim 1 wherein said means for locking said projections comprises an axially tapered circumferentially extending surface formed collectively by outer sides of said fingers, an axially shiftable internally tapered sleeve on said riser mating with said tapered surface of said fingers, and means for forcibly interengaging said tapered sleeve and said tapered surface.

8. An adjustable length ball cock riser assembly for a toilet tank comprising
inner and outer mutually telescoped riser pipe members, said inner member having a plurality of axially spaced circumferentially extending grooves, said outer member having a plurality of axially extending circumferantially spaced fingers collectively forming a frusto-conical locking surface, at least some of said fingers having inwardly directed projections at free ends thereof, and a locking nut threadedly engaged with said outer member, said nut having an internal frusto-conical locking surface mating with said frusto-conical surface of said fingers whereby as said nut is threaded upon said outer member the frusto-conical surfaces of said nut and fingers are axially shifted relative to one another to forcibly press said fingers toward said inner member and to press and hold said projections in a selected one of said grooves, at least one of said projections extending radially of its finger by a distance greater than the depth of its groove to insure forced engagement of the end of said one projection with the bottom of an associated groove, said projections and grooves being formed with mutually cooperating tapered faces thereby providing increased areas of contact between said projections and grooves to provide increased resistance to relative rotation of said members.

9. The assembly of claim 8 wherein said grooves each has a groove bottom and a pair of opposed frusto-conical faces flanking said groove bottom, wherein said projections each has an end and all collectively form a pair of opposed frusto-conical faces mating with said groove faces and flanking said projection ends.

10. The assembly of claim 9 wherein said projection end has a length slightly less than the length of said groove bottom and wherein each said projection extends radially of its finger by a distance greater than the depth of at least one of said grooves.

11. The assembly of claim 8 including a fill pipe sleeve fixed to one of said members, spaced therefrom and extending axially thereof, and a fill pipe slidably received within said fill sleeve.

12. The assembly of claim 11 wherein said outer member includes a water deflector secured thereto adjacent to and spaced from an end of said sleeve.

13. The assembly of claim 11 wherein said outer member includes a flange fixed adjacent a lower end thereof and a plurality of circumferentially spaced reinforcing ribs extending from said flange toward said fingers.

14. An adjustable ball cock assembly comprising,
a ball cock valve having an internally threaded riser opening and having a fill pipe opening,
an adjustable length assembly as set forth in claim 11, said first member of said adjustable length assembly being threadedly engaged in said riser opening, and said fill pipe being received in said fill pipe opening.

* * * * *